United States Patent [19]

Robbins

[11] 4,017,182
[45] Apr. 12, 1977

[54] PHOTOSENSITIVE MATERIAL POSITIONING SYSTEM

[75] Inventor: Daniel H. Robbins, Rochester, N.Y.

[73] Assignee: Itek Corporation, Lexington, Mass.

[22] Filed: July 2, 1975

[21] Appl. No.: 592,491

[52] U.S. Cl. .................................. 355/74; 226/93;
  352/76; 352/78 R; 352/183; 354/181;
  354/205; 354/241
[51] Int. Cl.² ........................................ G03B 27/58
[58] Field of Search ..................... 355/74, 40–43,
  355/64; 354/174, 181, 204–206, 241, 275;
  242/71, 71.7, 71.2; 226/93; 352/183, 78, 72,
  75, 76

[56] References Cited

UNITED STATES PATENTS 2,584,964  2/1952  Jacobson .................... 354/205

Primary Examiner—Richard A. Wintercorn
Attorney, Agent, or Firm—Homer O. Blair; Robert L. Nathans; Gerald H. Glanzman

[57] ABSTRACT

A camera-processor magazine is disclosed having a cartridge for storing light sensitive roll material, together with means for driving such material out of the cartridge and upon an exposure platen. A roller curtain for shielding the material when the magazine is open also functions to guide the leading portion of the roll material across the exposure platen and into the nip of a pair of exit rollers.

1 Claim, 1 Drawing Figure

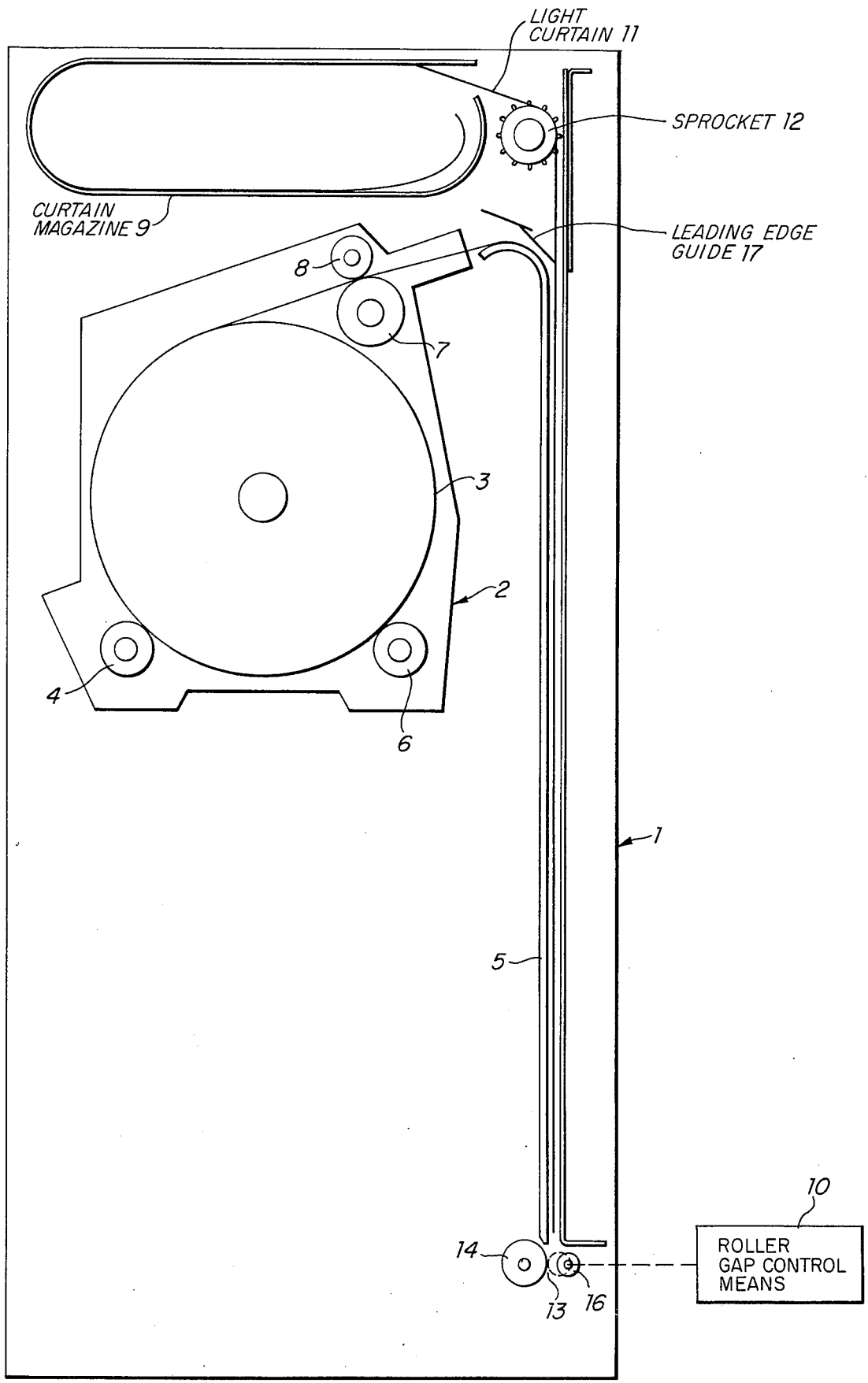

PHOTOSENSITIVE MATERIAL POSITIONING SYSTEM

BACKGROUND OF THE INVENTION

This invention relates to the field of camera-processor magazines.

In a camera-processor, a magazine is hinged mounted on the back of a camera stand for permitting easy opening of the magazine for changing rolls of material. The magazine is light tight and includes a vacuum platen which holds the unrolled material at the focal plane for exposure. After exposure, the material is driven out of the magazine, trimmed, and is thereafter driven through a processing station. A roller curtain shields the photosensitive material when the magazine is open to prevent fogging and may also be employed to partially shield selective portions of the material during exposure. In the prior art, guide members were positioned in front of the exposure plane in order to guide the material driven from the magazine plate storage cartridge across the vacuum platen and into the nip of a pair of exit drive rollers.

SUMMARY OF THE INVENTION

In accordance with the present invention, the above-mentioned guide members have been eliminated by employing the roller curtain additionally as a guide member.

Other objects, features, and advantages of the present invention will become apparent upon perusal of the following detailed description taken in conjunction with the sole FIGURE which illustrates an embodiment of the invention.

SPECIFIC DESCRIPTION

Referring to the figure, a magazine 1 is disclosed having a cartridge 2 positioned therein, such cartridge containing a roll of film material 3 supported on rollers 4 and 6. A pair of drive rollers 7 and 8 are also contained in cartridge 2 for driving material out of the cartridge and for enabling the roll to be rewound. A light curtain carrier 9 contains a flexible roller curtain 11 which is pulled out of carrier 9 by a drive sprocket 12. When it is desired to shield the exposure plane from light, to prevent fogging of the material upon the changing of the cartridge, sprocket 12 drives the leading edge of curtain 11 adjacent roller gap portion 13. At this time exit drive rollers 14 and 16 are separated so as to define gap portion 13. Drive rollers 7 and 8 thereafter commence driving the leading edge of the material whereby the leading edge strikes upper guide member 17 which directs such leading edge at an angle against the roller curtain 11 which is held in place by light trapping side guides which consist of narrow metal strips for contacting edge portions of the paper. Since the curtain is fairly stiff, it is able to "push back" against the leading edge portion of the photosensitive material to guide and maintain it in the image plane. The light curtain thus has a second function that causes the leading edge portion of the film to assume a downward orientation wherein the leading edge portion is now driven along the face of the light curtain, in contact therewith, until it reaches gap portion 13. Driver rollers 14 and 16 are closed together, by means of control 10, engaging the leading edge portion of the film. After this drive function is accomplished, the door mounted magazine is closed to enable the light curtain to be raised. After exposure to an image, the exit drive rollers commence transporting the exposed portion out of the magazine to cause an unexposed portion to be positioned upon vacuum plate platen 5 for the next exposure. When it becomes necessary to change rolls of material, the light curtain is again lowered and the door may be opened and roll material is rewound during which time the light curtain shields the material to prevent fogging. Rollers 4, 6, 7, or 8 may be driven by conventional hand cranks not shown. Roller gap control means may be any conventional actuating device such as solenoid.

While a preferred embodiment of the invention has been described, the teachings of this invention will readily suggest many other embodiments to those skilled in the art.

What is claimed is:

1. A photosensitive material positioning system for transporting photosensitive material from a cartridge to an exposure platen comprising:
    a. means for lowering a light curtain over said exposure platen;
    b. means for driving said material from said cartridge while directing the leading edge of said material at an acute angle relative to the plane of said light curtain so that said material becomes straightened out by said light curtain and travels along said curtain in contact therewith while being driven by said drive means, thereby to eliminate photosensitive material guide means which would be otherwise positioned adjacent said exposure platen in front of said platen;
    c. means for raising said light curtain after final positioning of said material upon said platen to enable exposure thereof to a light image;
    d. a pair of exit drive rollers for driving said material off of said exposure platen; and
    e. exit drive roller control means for selectively opening and closing the nip between said roller pair.

* * * * *